United States Patent [19]

Delfosse et al.

[11] 3,940,550

[45] Feb. 24, 1976

[54] ULTRAFINE NATURAL CALCIUM CARBONATES AS COATING PIGMENTS IN COATED PAPERS

[75] Inventors: Pierre Delfosse, Paris, France; Alfred Bosshard, Oftringen, Switzerland

[73] Assignee: Pluss-Staufer AG, Switzerland

[22] Filed: Oct. 15, 1973

[21] Appl. No.: 406,430

[30] Foreign Application Priority Data

Oct. 18, 1972 Germany............................ 2251099

[52] U.S. Cl.............. 428/511; 106/214; 106/288 B; 106/306; 260/42; 428/514; 428/537
[51] Int. Cl.$^2$...................... B32B 23/08; B32B 27/10
[58] Field of Search............. 117/152, 155 UA, 156; 106/288 B, 306, 214; 260/42; 428/511, 514, 537

[56] References Cited

UNITED STATES PATENTS

| | | | |
|---|---|---|---|
| 3,085,894 | 4/1963 | Rowland | 106/306 |
| 3,534,911 | 10/1970 | William | 241/16 |
| 3,578,493 | 5/1971 | Smith | 117/155 |

FOREIGN PATENTS OR APPLICATIONS

| | | | |
|---|---|---|---|
| 1,223,102 | 2/1971 | United Kingdom | 117/155 |
| 1,223,414 | 2/1971 | United Kingdom | 117/155 |

*Primary Examiner*—Michael R. Lusignan
*Attorney, Agent, or Firm*—Pollock, Vande Sande & Priddy

[57] ABSTRACT

A coated paper comprising an ultrafine natural calcium carbonate as a pigment, which has an average statistical particle diameter of from 0.5 to 0.7 $\mu$m, a maximum diameter of from 3.0 to 4.0 $\mu$m, and a specific surface area of at least 12sq.m./g.

13 Claims, No Drawings

ULTRAFINE NATURAL CALCIUM CARBONATES AS COATING PIGMENTS IN COATED PAPERS

Applicants' German Patent Application No. P 22 51 099.2 relates to a mill for grinding minerals which are used as pigments or fillers, said mill being characterised in that the grinding elements consist of 30 – 70% by weight of zirconium oxide, 0.1 – 5% by weight of aluminium oxide and 5 – 20% by weight of silicon oxide.

This mill makes it possible to produce ultrafine minerals. For example, chalk from coccolith shells can be ground ultrafine. This mill is described in our copending U.S. application Ser. No. 401,487 filed Sept. 27, 1973, which specifies the characteristics of the grinding elements mentioned above. Such grinding elements are used to produce the ultrafine mineral pigments used in the papers according to the present invention. The disclosure of Ser. No. 401,487 is incorporated herein by reference.

The use of natural calcium carbonates as coating pigments in coated papers is already known.

From British Patent Specification No. 1,223,102 there is known a coating pigment for coated papers which is mainly characterised in that at least 60% by weight of the particles have a diameter smaller than 2 $\mu$m and not more than 5% by weight of the particles have a diameter greater than 10 $\mu$m and that 0.05% by weight of the particles are greater than 300 mesh B/S sieve. Preferably, 70 – 95% by weight of the particles should have a diameter smaller than 2 $\mu$.

From British Patent Specification No. 1,223,414 there is known a pigment consisting of 60 – 25% by weight of clay and 40 – 75% by weight of natural lime, 75% by weight of the clay particles having a diameter smaller than 2 $\mu$m and 30 – 50% by weight of the natural lime having a diameter smaller than 2 $\mu$m.

Compared with coarser pigments, these natural calcium carbonates have good rheological properties; a comparatively high degree of whiteness; low binding agent requirements; an improved air permeability; a good mat effect if larger amounts are used; and, in comparison with kaolin, the costs for the coating material recipes are reduced. However, it has not yet been possible to overcome the reduced coating gloss when small amounts are used; the reduced print gloss; the poorer knock-loose properties and poorer drying of printing inks; and the tendency to build up and dust in offset machines.

In order to obviate these disadvantages, precipitated calcium carbonates with a higher degree of fineness and higher specific surface have already been used. However, this led to other problems, particularly to a poorer dispersion (agglomerates), high viscosity, and high binding agent requirements.

Calcium carbonates of various degrees of fineness and different geological origin have been tested in extensive series of experiments over many years for their usefulness as coating pigments in coated papers. Surprisingly, it has now been found in further developing the invention of German Patent Application No. P 22 51 099.2 that ultrafine natural calcium carbonates with an average statistical particle diameter of 0.5 to 0.7 $\mu$m, a maximum of 3 – 4 $\mu$m and a specific surface of at least 12 sq.m/g can be produced and used as coating pigments in coated papers. As mentioned previously, the grinding mill disclosed in our copending application Ser. No. 401,487 is especially suited for producing such ultrafine natural calcium carbonates.

The desired properties in comparison with kaolin are only achieved if the calcium carbonates have a specific surface of at least 12 sq.m/g. The calcium carbonates used according to the invention are primarily suitable as coating pigments in roll offset, sheet offset and mat papers.

Suitable natural calcium carbonates are mainly chalk from coccolith shells or crystalline calcite.

Other advantages and features of the invention follow from the following comparative tests:

A. Recipes: (weight units)

| Examples: | 1 | 1a | 2 | 2a | 3 | 3a | 4 | 4a | 5 | 5a |
|---|---|---|---|---|---|---|---|---|---|---|
| kaolin | 100 | 100 | | | | | 70 | 70 | 70 | 70 |
| nat. calcium carbonate of appr. 35% < 2$\mu$m diameter | | | 100 | 100 | | | 30 | 30 | | |
| nat. calcium carbonate acc. to invention | | | | | 100 | 100 | | | 30 | 30 |
| polysalt CA | 0.4 | 0.4 | 0.4 | 0.4 | 0.4 | 0.4 | 0.4 | 0.4 | 0.4 | 0.4 |
| Acronal PR 8073 (solid) | 12 | 8 | 12 | 8 | 12 | 8 | 12 | 8 | 12 | 8 |
| Amisol 5582 (solid) (starch) | | 6 | | 6 | | 6 | | 6 | | 6 | blade coat 12 g/sq.m/page; 800 m/min;
body paper: suphite cellulose (8% ash), non-sized;
final weight: 92 g/sq.m
calendering: 12-roll supercalender; 200 kp/cm; 200 m/min.

B. Evaluation

| Examples: | 1 | 1a | 2 | 2a | 3 | 3a | 4 | 4a | 5 | 5a |
|---|---|---|---|---|---|---|---|---|---|---|
| surface weight g/sq.m | 92 | 92 | 92 | 92 | 92 | 92 | 92 | 92 | 92 | 92 |
| gloss (Tappi) % | 62 | 59 | 19 | 17 | 56 | 53 | 38 | 36 | 60 | 57 |
| print gloss, % at 1.2 g/sq.m printing ink | 80 | 72 | 25 | 20 | 77 | 70 | 59 | 53 | 79 | 71 |
| knock-loose properties, sec. (final value) | 300 | 600 | 900 | 9–1800 | 120 | 300 | 600 | 900 | 120–300 | 3–600 |
| K + N, % | 52 | 45 | 35 | 30 | 69 | 61 | 48 | 42 | 57 | 51 |

B. Evaluation -continued

| Examples: | 1 | 1a | 2 | 2a | 3 | 3a | 4 | 4a | 5 | 5a |
|---|---|---|---|---|---|---|---|---|---|---|
| porosity, Bekk, sec. | 20 | 22 | 23 | 26 | 11 | 12 | 18 | 20 | 13 | 14 |
| degree of whiteness, % R 457 | 81.5 | 81.3 | 84.3 | 84.0 | 84.9 | 84.7 | 83.2 | 83.1 | 83.4 | 83 |
| opacity, % | 81. | 80.6 | 78.5 | 78.2 | 81.5 | 81.2 | 80.6 | 80.4 | 81.3 | 81 |

As is recognized in the art, the "polysalt CA" referred to in the Recipes used in the Examples is an organic dispersing agent of the family of polyacrylates or alkaline polymethacrylates. Similarly, "Acronal PR" is a latex additive of the type commonly in use. Those skilled in the art will recognize that many dispersing agents and other additives could be used in accordance with the teachings of the present invention, in addition to the exemplary substances mentioned in the Examples.

The use of the ultrafine natural calcium carbonates of the invention as coating pigments in coated papers has mainly the following advantages:

An increased gloss, increased print gloss, improved porosity, improved degree of whiteness and improved opacity.

According to the state of the art (British Patent Specification No. 1,223,414), mat papers are produced at a low calender pressure. The result is poor printability. By contrast, mat papers which have outstanding printability, even when high calender pressures are applied, are obtained according to the invention with the following pigment composition, for example:

50% of natural calcium carbonate according to the invention
25% of natural calcium carbonate with about 35% < 2μm diameter
25% kaolin.

What we claim is:

1. Paper coated with a composition comprising an ultrafine natural calcium carbonate as a pigment, said pigment having an average statistical particle diameter of from 0.5 to 0.7 μm, a maximum diameter of from 3.0 to 4.0 μm, and a specific surface area of at least 12 sq.m./g.

2. Paper according to claim 1, in the form of roll offset paper or sheet offset paper.

3. Paper according to claim 2, which is a mat paper.
4. Paper according to claim 1, wherein the pigment is chalk derived from coccolith shells.
5. Paper according to claim 1, wherein the pigment is crystalline calcite.
6. Paper according to claim 2, wherein the pigment is chalk derived from coccolith shells.
7. Paper according to claim 2, wherein the pigment is crystalline calcite.
8. Paper coated with a pigment composition, comprising a mixture of: 70 parts by weight of kaolin; and 30 parts by weight of an ultrafine natural calcium carbonate having an average statistical particle diameter of from 0.5 to 0.7 μm, a maximum diameter of from 3.0 to 4.0 μm, and a specific surface area of at least 12 sq.m./g.
9. Paper according to claim 8, wherein the natural calcium carbonate is chalk derived from coccolith sheels.
10. Paper according to claim 8, wherein the natural calcium carbonate is crystalline calcite.
11. Paper coated with a pigment composition comprising a mixture of: 25 percent by weight kaolin; 25 percent by weight natural calcium carbonate having approximately 35 percent by weight of particles smaller than 2 μm; and 50 percent by weight of an ultrafine natural calcium carbonate having an average statistical particle diameter of from 0.5 to 0.7 μm, a maximum diameter of from 3.0 to 4.0 μm, and a specific surface area of at least 12 sq.m./g;
12. Paper according to claim 11, wherein the ultrafine natural calcium carbonate is chalk derived from coccolith shells.
13. Paper according to claim 11, wherein the ultrafine natural calcium carbonate is crystalline calcite.

* * * * *